2,799,647
Patented July 16, 1957

2,799,647
DRILLING FLUID COMPOSITION AND METHOD

Bert Borcherdt, Ventura, Calif.

No Drawing. Application December 3, 1954,
Serial No. 473,051

10 Claims. (Cl. 252—8.5)

This invention relates to the art of drilling wells and has particular reference to a drilling fluid composition and method for preventing and restoring the loss of circulation of drilling fluids when drilling through loose, porous, fractured or creviced formations.

The rotary drilling of oil and gas wells requires the use of a drilling fluid or mud which consists of a suspension in a base of water or oil, or water and oil, of a material such as clays, calcium carbonate, etc. Additional weight materials such as crushed oyster shells, barytes, galena, etc., are often used. The drilling fluid is introduced through the hollow drilling stem and is released into the well hole or bore from openings in the drilling bit, from whence it is pumped back to the surface for recirculation. These drilling fluids perform the functions of lubricating and cooling the drilling bit, carrying the cuttings up to the surface, furnishing a static head to overcome formation pressures, and they form on the walls of the bore a substantially impervious sheath or filter cake to prevent the loss of fluid into the formation.

Although as indicated, the usual drilling fluids tend to form a more or less fluid-impervious filter cake which retards or prevents fluid in the well from penetrating into and being wasted in the surrounding earth formations, earth strata are sometimes encountered into which the drilling fluid passes in excessive amount without deposition of an adequate filter cake. This occurs when the earth formation is unusually porous, loose, creviced or fractured, such that openings are present which are large enough to admit the drilling fluid without adequate filtration action and formation of a sealing filter cake. Such loss of circulation of the drilling fluid is obviously extremely dangerous to the economic success of a drilling operation, resulting in loss of valuable drilling fluid material, loss of pressure, the complete suspension of the drilling until the problem is cured, and in some cases even complete abandonment of the entire well.

A great many expedients have been heretofore proposed in attempts to solve this problem of loss of circulation and possibly foremost among these expedients is the addition to the drilling fluid of materials which theoretically will be strained out of the fluid as it passes into the formation of the lost circulation zone, thereby building up a deposit or filter cake of material which will block the passage of further fluid therethrough. A large number of different types of so-called lost circulation materials have been proposed for such use, but for reasons as varied as the suggested materials themselves, most of the proposals have not met with success. Even the materials which have been found to be actually useful are subject to disadvantages such as high cost and total or partial failure in certain lost circulation zones.

One of the principal objects of this invention is, therefore, to provide a drilling fluid composition containing a novel and highly efficacious lost circulation material.

Another object of this invention is to provide a drilling fluid composition containing a novel lost circulation material which is effective for the sealing of a wide range of types of lost circulation formations.

It is known by those skilled in the art that one of the important properties of a successful lost circulation material is a controlled distribution in particle size. Additionally, although probably not well recognized, is the fact that a successful lost circulation material should be composed of particles of various shapes. Both of these properties contribute to the ability of the material to fill in the voids of the lost circulation zone by building up a bridge composed of these particles of varying size and shape.

It is accordingly another object of this invention to provide a drilling fluid composition and a method for the use of the same, which composition contains a novel lost circulation material possessing the desired properties of controlled distribution of particle sizes and a variety of shapes, yet which is readily available, inexpensive and is easy to process.

Another object of this invention is to provide a drilling fluid composition containing a lost circulation material which may be kept in suspension therein as a preventive measure against loss of circulation without materially affecting the drilling operation.

A more specific object of this invention is to provide a drilling fluid composition which contains a lost circulation material consisting of ground almond shells.

Other objects and advantages of this invention it is believed will be readily apparent from the following detailed description of a preferred embodiment thereof.

Briefly, this invention consists in the surprising discovery that ground almond shells is an excellent material to be added to drilling fluids for preventing or stopping loss of circulation of the fluid.

It will be understood that the almond growing on the tree has an outer hull or husk which tends to separate from the shell near maturity, and which is completely removed after harvesting. The hull, which is a spongy outer covering of the nut to protect it while growing is entirely different from the inner protective casing referred to as the shell and it is to be understood that the hull or husk has no utility in the present invention.

The physical structure of the almond shell is basically different from that of any other nut and it has been discovered that due to this unique structure, almond shells may be readily broken down, by use of conventional equipment designed for grinding other materials, into particles having proper size distribution and the varying shapes required in a satisfactory lost circulation material.

The almond shell consists of a hard inner core surrounded by a relatively thick and coarse outer layer which is interlaced with fibers. When this shell is processed in a hammer mill or other grinding equipment, the inner core breaks down into relatively thin flakes or plates and the outer portion breaks down into fibers and granules, the granules being particles other than flakes or fibers and having no uniform geometrical shape. The desired gradation in particle sizes is obtained through proper control of the grinding operation.

Thus it will be understood that due to the inherent and unique physical structure of the almond shell, it breaks down on simple grinding into discrete particles having varying shapes classified as flakes, fibers and granules. These varying shapes, found in a single material, are ideal for lost circulation purposes, when combined with particle size distribution. In use, as the drilling fluid containing this material passes into a porous or fractured formation, the large flakes, fibers and granules form a partial bridge across the openings, slowing down the rate of loss of fluid and leaving smaller voids to be sealed. The flakes appear to make the major contribution toward this partial bridge formation although the large fibers and granules cooperate therewith. After the formation of the partial bridge, the progressively smaller flakes, fibers and granules come into play, bridging or plugging the progressively smaller voids until the seal is complete.

The following specific example illustrates a process for preparing the lost circulation material used in the present invention, but it is to be understood that the invention is not to be limited thereto.

The raw material consists of almond shells, in large pieces as they come from the sheller, and preferably having a moisture content below 10%. The shells are ground in a hammer mill (Prater Pulverizer) having 3/8-inch screen openings and driven by a 30 H. P. motor at 1750 R. P. M. The material is thus sized from No. 2 Tyler mesh to 48 mesh with small percentages above and below. A portion of this material, preferably about 20% thereof, is further ground in a swing blade comminuting machine (Fitzmill) having 0.050-inch screen openings and driven by a 10 H. P. motor at 3400 R. P. M. The material is thus fine ground roughly from Tyler 48 mesh to 325 mesh with a small percentage below 325 mesh. The fine ground material is thoroughly blended into the coarse ground material to provide the finished product.

Preferably, the soft shell variety of almond shells is used, although the fine ground material may consist wholly of the hard shell variety.

The material produced as indicated above is composed of flakes in a size gradation ranging from about 1/2 inch length to about 1/64 inch length, fibers from about 3/4 inch length to 1/64 inch length and granules ranging in size from 8 to 325 mesh. It is, of course, not intended to limit the invention to these size ranges, but it is extremely important that the grinding operation be carried out so that there are substantial amounts of flakes, fibers and granules, and that the ground material contain varying sizes of each of such particles. By "gradation in particle size," as used in the claims, it is meant that there is a substantial quantity of material of each size within the useful range, i. e., there is a substantial quantity of the fine material, a substantial quantity of the intermediate size material, and a substantial quantity of the coarser size material.

The efficiency of ground almond shells for use as a lost circulation material has been established both in the laboratory and in actual use in the field. Table I below summarizes the results of the standard API test for lost circulation materials, as applied to the material of this invention. In accordance with this test, the ground almond shells were mixed, in the proportion of 10 pounds per barrel, with 800 ml. of 30 C. P. aquagel drilling mud. This mixture was poured into a cylinder on top of a bed of shot weighing 800 grams. Air pressure at the rate of 100 pounds per square inch was applied to the surface of the mud and a valve below the shot bed was opened. The time for the lost circulation material to bridge or seal across the top of the shot bed and shut off the flow of fluid therethrough was measured by stop watch, and the volume of fluid lost was also measured.

*Table I*

Time to bridge (seconds) _____ 8
Volume to bridge (ml.) _____ 240
Volume at 10 minutes _____ 245

Table II below represents the results of the same test but utilizing 15 pounds of ground shells per barrel:

*Table II*

| Test No. | 1 | 2 | 3 |
| --- | --- | --- | --- |
| Time to bridge (seconds) | 7 | 4.5 | 5 |
| Volume to bridge (ml.) | 105 | 145 | 110 |
| Volume at 10 minutes | 145 | 150 | 150 |

The amount of ground almond shells used in actual practice may vary depending upon the type of drilling fluid and the particular formation difficulties encountered, although generally from about 5–40 lbs. per barrel will be adequate. The material of this invention has been used successfully in two separate walls in the Southern California area. In both cases the addition of about 15 lbs. of the material of this invention per barrel of the clay-water drilling fluid resulted in substantially total recirculation of the drilling fluid where loss of circulation had been encountered in sand and highly fractured shale formations. It is to be understood that the ground almond shells may be used in all types of drilling fluids, including oil base, water base and emulsion fluids.

In addition to the advantages pointed out above, it should be pointed out that the material is inherently strong due in large part to its fiber content and has a high resistance to fracture, an essential quality because of the high operating pressures encountered in well drilling. The material does not soften on exposure to the drilling fluid and conditions in the well, is inert and does not ferment in use and has a weight permitting it to remain in suspension in the drilling fluid. Additionally, the material does not adversely affect the drilling fluid or the mud circulating system.

While I have fully described preferred embodiments of my invention, it is to be understood that I do not wish to be limited to the details herein set forth, but my invention is of the full scope of the appended claims.

I claim:
1. A drilling fluid containing a lost circulation material comprising almond shells consisting of discrete particles in the form of flakes, fibers and granules, said particles being further characterized by a gradation in particle size.

2. A drilling fluid containing from about 5–40 lbs. of a lost circulation material per barrel of fluid, said material comprising almond shells consisting of discrete particles in the form of flakes, fibers and granules, said particles being further characterized by a gradation in particle size.

3. A drilling fluid containing a lost circulation material comprising ground almond shells consisting of discrete particles in the form of flakes, fibers and granules, said particles being further characterized by a gradation in particle size ranging from about 2 mesh to about 325 mesh.

4. A drilling fluid containing from about 5–40 lbs. of a lost circulation material per barrel of fluid, said material comprising ground almond shells consisting of discrete particles in the form of flakes, fibers and granules, said particles being further characterized by a gradation in particle size ranging from about 2 mesh to about 325 mesh.

5. In a process for drilling a well with well drilling tools wherein there is circulated in the well a drilling fluid, the method of forming a filter cake on the wall of said well to decrease the loss of fluid from said drilling fluid contained therein into surrounding earthen formations, which comprises admixing with said drilling fluid almond shells consisting of discrete particles in the form of flakes, fibers and granules, said particles being further characterized by a gradation in particle size, in an amount sufficient to lower the fluid loss through said filter cake but insufficient to increase the viscosity of said fluid to such an extent as to render said drilling fluid uncirculatable, and contacting said wall of said well with the resulting drilling fluid to form said filter cake thereon.

6. In a process for drilling a well with well drilling tools wherein there is circulated in the well a drilling fluid, the method of forming a filter cake on the wall of said well to decrease the loss of fluid from said drilling fluid contained therein into surrounding earthen formations, which comprises admixing with said drilling fluid from about 5–40 pounds of almond shells per barrel of fluid, said shells consisting of discrete particles in the form of flakes, fibers and granules, said particles being further characterized by a gradation in particle size, in an amount sufficient to lower the fluid loss through said filter cake but insufficient to increase the viscosity of said fluid to such an extent as to render said drilling fluid uncirculatable, and contacting said wall of said well with the resulting resulting drilling fluid to form said filter cake thereon.

7. In a process for drilling a well with well drilling tools wherein there is circulated in the well a drilling fluid, the method of forming a filter cake on the wall of said well to decrease the loss of fluid from said drilling fluid contained therein into surrounding earthen formations, which comprises admixing with said drilling fluid ground almond shells consisting of discrete particles in the form of flakes, fibers and granules, said particles being further characterized by a gradation in particle size ranging from about 2 mesh to about 325 mesh, in an amount sufficient to lower the fluid loss through said filter cake but insufficient to increase the viscosity of said fluid to such an extent as to render said drilling fluid uncirculatable, and contacting said wall of said well with the resulting drilling fluid to form said filter cake thereon.

8. In a process for drilling a well with well drilling tools wherein there is circulated in the well a drilling fluid, the method of forming a filter cake on the wall of said well to decrease the loss of fluid from said drilling fluid contained therein into surrounding earthen formations, which comprises admixing with said drilling fluid from about 5-40 pounds of almond shells per barrel of fluid, said shells consisting of discrete particles in the form of flakes, fibers and granules, said particles being further characterized by a gradation in particle size ranging from about 2 mesh to about 325 mesh, in an amount sufficient to lower the fluid loss through said filter cake but insufficient to increase the viscosity of said fluid to such an extent as to render said drilling fluid uncirculatable, and contacting said wall of said well with the resulting drilling fluid to form said filter cake thereon.

9. A drilling fluid containing from about 5-40 lbs. of a lost circulation material per barrel of fluid, said material comprising ground soft shell almond shells consisting of discrete particles in the form of flakes, fibers and granules, said particles being further characterized by a gradation in particle size ranging from about 2 mesh to about 325 mesh.

10. A drilling fluid containing from about 5-40 lbs. of a lost circulation material per barrel of fluid, said material comprising ground almond shells consisting of discrete particles in the form of flakes, fibers and granules, said particles being further characterized by a gradation in particle size ranging from about 2 mesh to about 325 mesh, the particles larger than about 48 mesh being substantially all soft shell almond shells and the particles smaller than about 48 mesh being substantially all hard shell almond shells.

References Cited in the file of this patent

UNITED STATES PATENTS

| | | |
|---|---|---|
| 2,599,745 | Campbell et al. | June 10, 1952 |
| 2,650,195 | Cardwell et al. | Aug. 25, 1953 |

OTHER REFERENCES

Rogers: Composition and Properties of Oil Well Drilling Fluids, revised edition, pp. 562, 563 and 564 (1953), by Gulf Publishing Company.